(12) United States Patent
Lin et al.

(10) Patent No.: US 11,353,884 B2
(45) Date of Patent: Jun. 7, 2022

(54) ROBOT WITHOUT DETECTION DEAD ZONE

(71) Applicant: PixArt Imaging Inc., Hsin-Chu County (TW)

(72) Inventors: Shih-Chin Lin, Hsin-Chu County (TW); Wei-Chung Wang, Hsin-Chu County (TW); Guo-Zhen Wang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 486 days.

(21) Appl. No.: 16/258,675

(22) Filed: Jan. 28, 2019

(65) Prior Publication Data

US 2020/0241550 A1 Jul. 30, 2020

(51) Int. Cl.
*G05D 1/02* (2020.01)
*B25J 11/00* (2006.01)
*G06T 7/521* (2017.01)
*A47L 11/40* (2006.01)

(52) U.S. Cl.
CPC ........ *G05D 1/0248* (2013.01); *A47L 11/4011* (2013.01); *B25J 11/0085* (2013.01); *G05D 1/0242* (2013.01); *G06T 7/521* (2017.01); *A47L 2201/06* (2013.01); *G05D 2201/0215* (2013.01)

(58) Field of Classification Search
CPC ............. G05D 1/02; B25J 11/00; G06T 11/40
See application file for complete search history.

(56) References Cited

U.S. PATENT DOCUMENTS

| | | | |
|---|---|---|---|
| 2005/0251292 A1* | 11/2005 | Casey | B25J 9/1697 700/245 |
| 2015/0185322 A1* | 7/2015 | Haegermarck | G05D 1/0248 700/259 |
| 2016/0378117 A1* | 12/2016 | Szatmary | G06K 9/6215 382/153 |
| 2017/0001311 A1* | 1/2017 | Bushman | A47L 9/2826 |
| 2017/0197315 A1* | 7/2017 | Haegermarck | G05D 1/0272 |
| 2017/0332871 A1* | 11/2017 | Sung | A47L 9/2884 |
| 2017/0332872 A1* | 11/2017 | Jun | G06K 9/74 |
| 2017/0336796 A1* | 11/2017 | Jun | A47L 9/0488 |
| 2019/0079531 A1* | 3/2019 | Haegermarck | A47L 11/4061 |
| 2019/0171217 A1* | 6/2019 | Lee | G05D 1/0287 |
| 2019/0320867 A1* | 10/2019 | Noh | A47L 9/2852 |
| 2020/0081451 A1* | 3/2020 | Forsberg | A47L 9/2815 |
| 2020/0205633 A1* | 7/2020 | Baum | G01B 11/026 |

FOREIGN PATENT DOCUMENTS

CN 108603935 A 9/2018

* cited by examiner

*Primary Examiner* — Kira Nguyen
(74) *Attorney, Agent, or Firm* — Hauptman Ham, LLP

(57) ABSTRACT

There is provided a cleaning robot including a first light source module and a second light source module respectively project a first light section and a second light section, which are vertical light sections, in front of a moving direction, wherein the first light section and the second light section cross with each other at a predetermined distance in front of the cleaning robot so as to eliminate a detection dead zone between the first light source module and the second light source module in front of the cleaning robot to avoid collision with an object during operation.

19 Claims, 10 Drawing Sheets

ROBOT WITHOUT DETECTION DEAD ZONE

BACKGROUND

1. Field of the Disclosure

This disclosure generally relates to a cleaning robot and, more particularly, to a cleaning robot capable of eliminating the detection dead zone in front of a moving direction to avoid collision with an obstacle.

2. Description of the Related Art

The cleaning robot has become one important product among various home appliances in a smart home.

In the cleaning robot using an image sensor as a detecting means, as the image sensor has detection dead zones, it is possible that an environmental object is not detected during operation. Accordingly, one issue of this kind of cleaning robots is how to avoid collision with other objects in the operating environment so as to reduce noises generated during operation and prevent damages to the furniture, decoration and device itself.

Accordingly, it is necessary to provide a cleaning robot capable of eliminating the detection dead zone in front of a moving direction to avoid collision with an obstacle.

SUMMARY

The present disclosure provides a cleaning robot that projects vertical light sections crossing with each other in front of the cleaning robot to eliminate the detection dead zone in front of a moving direction and avoid collision with an obstacle.

The present disclosure further provides a cleaning robot capable of detecting both the cliff and the obstacle in front of the cleaning robot.

The present disclosure provides a cleaning robot including a first light source module, a second light source module, an image sensor and a processor. The first light source module is configured to project a first light section toward a moving direction. The second light source module is configured to project a second light section toward the moving direction, wherein the first light section and the second light section are vertical light sections and crossing with each other at a predetermined distance in front of the cleaning robot. The image sensor is configured to capture an image frame covering the first light section and the second light section. The processor is configured to calculate an object depth according to a first line image associated with the first light section and a second line image associated with the second light section in the image frame.

The present disclosure further provides a cleaning robot including a first light source module, a second light source module, a third light source module, an image sensor and a processor. The first light source module is configured to project a first light section, which is a vertical light section, toward a moving direction. The second light source module is configured to project a second light section, which is another vertical light section, toward the moving direction. The third light source module is configured to project a horizontal light section toward the moving direction. The image sensor is configured to capture an image frame covering the first light section, the second light section and the horizontal light section. The processor is configured to identify a cliff in front of the moving direction according to a first line image associated with the first light section and a second line image associated with the second light section in the image frame, and calculate an object depth according to a third line image associated with the horizontal light section in the image frame.

The present disclosure further provides a cleaning robot including a light source group, an image sensor and a processor. The light source group is configured to project a first light section and a second light section, which are vertical light sections, toward a moving direction and project a horizontal light section toward the moving direction. The image sensor is configured to capture an image frame covering the first light section, the second light section and the horizontal light section. The processor is configured to calculate a cliff distance in front of the moving direction according to a first line image associated with the first light section and a second line image associated with the second line section in the image frame, and calculate an object depth according to a third line image associated with the horizontal light section in the image frame.

The present disclosure further provides a robot including a light source group, an image sensor and a processor. The light source group is configured to project a first light section and a second light section, which are vertical light sections, toward a moving direction and crossing with each other at a predetermined distance in front of the robot. The image sensor is configured to capture an image frame covering the first light section and the second light section. The processor is configured to calculate a distance according to a first line image associated with the first light section and a second line image associated with the second light section in the image frame.

In the cleaning robot of the present disclosure, different light source modules project vertical light sections simultaneously or successively. When the different light source modules project the vertical light sections simultaneously, the projected different light sections preferably have different section features, such as different intensities, different widths, different numbers and/or different flicker frequencies.

In the cleaning robot of the present disclosure, a same diffractive optical element is used to generate more than one projected light sections when light is passing through said same diffractive optical element.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The cleaning robot in every embodiment of the present disclosure is used to eliminate the detection dead zone in front of a moving direction so as to prevent the cleaning robot from humping into other obstacles during operation.

Figure 1A:
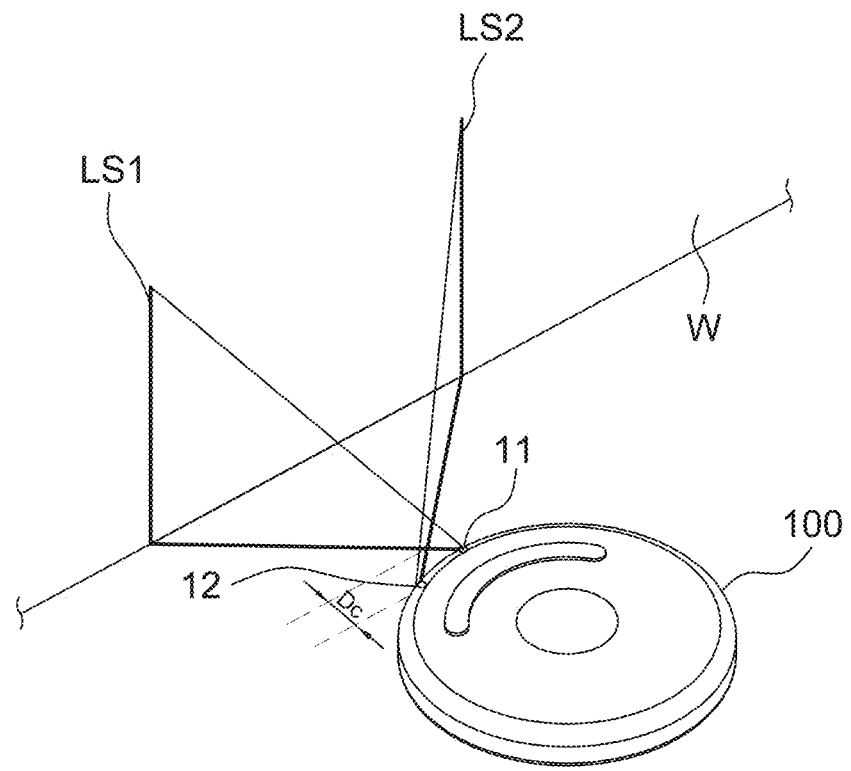
FIG. 1A is an operational schematic diagram of a cleaning robot according to a first embodiment of the present disclosure.
Figure 1B:
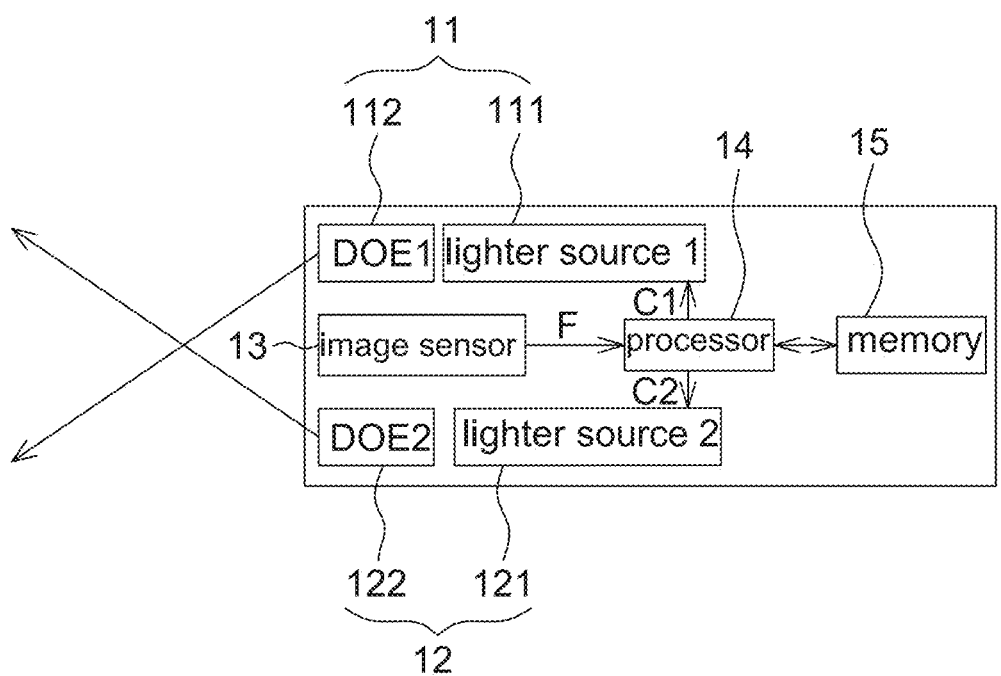
FIG. 1B is a block diagram of a cleaning robot according to the first embodiment of the present disclosure.

Referring to FIGS. 1A and 1B together, FIG. 1A is an operational schematic diagram of a cleaning robot 100 according to a first embodiment of the present disclosure; and FIG. 1B is a block diagram of a cleaning robot 100 according to the first embodiment of the present disclosure.

The cleaning robot 100 includes a first light source module 11, a second light source module 12, and image sensor 13, a processor 14 and a memory 15, wherein the first light source module 11, the second light source module 12 and the image sensor 13 are electrically connected to the processor 14 to be controlled thereby, and the memory 15 is also electrically connected to or embedded in the processor 14 to be accessed thereby.

The first light source module 11 includes a first light source 111 and a first diffractive optical element (DOE1) 112. The first light source 111 is, for example, a laser diode for emitting invisible light, and controlled by the processor 14 (e.g., via a control signal C1) to emit light continuously or at a flicker frequency. The DOE1 112 is used to generate a first light section LS1 when the light emitted by the first light source 111 passes therethrough. For example, FIG. 1A shows that the first light source module 11 is arranged closer to a right side of the cleaning robot 100 and for projecting the first light section LS1 toward a left-front direction of a moving direction of the cleaning robot 100.

The second light source module 12 includes a second light source 121 and a second diffractive optical element (DOE2) 122. The second light source 121 is, for example, a laser diode for emitting invisible light, and controlled by the processor 14 (e.g., via a control signal C2) to emit light continuously or at a flicker frequency. The DOE2 122 is used to generate a second light section LS2 when the light emitted by the second light source 121 passes therethrough. For example, FIG. 1A shows that the second light source module 12 is arranged closer to a left side of the cleaning robot 100 and for projecting the second light section LS2 toward a right-front direction of the moving direction of the cleaning robot 100.

According to this arrangement, after the first light section LS1 and the second light section LS2 cross with each other at a predetermined distance Dc in front of the cleaning robot 100, two light sections have an included angle (which is determined according to a pitch between the first light source module 11 and the second light source module 12 as well as projecting angles of light sections) are formed on a moving surface in front of the cleaning robot 100. Meanwhile, if a wall (including a surface of any object) exists in front of the cleaning robot 100, two light sections, i.e. LS1 and LS2, parallel to each other are projected on the wall as shown in FIG. 1A. In the present disclosure, widths of the first light section LS1 and the second light section LS2 are not particularly limited but determined according to the sensitivity and detectable range of the image sensor 13.

Accordingly, when there is a small object, e.g., a chair leg or a table leg smaller than a distance (i.e. the pitch) between the first light source module 11 and the second light source module 12, in front of the cleaning robot 100, said small object is illuminated by the light source modules 11 and 12 and detected by the image sensor 13 such that the detection dead zone ahead of the cleaning robot 100 is eliminated.

The image sensor 13 is, for example, a CCD image sensor, a CMOS image sensor or other optical sensors for detecting light signals and outputting electrical signals. The image sensor 13 acquires image frames F covering the first light section LS1 and the second light section LS2 toward a moving direction of the cleaning robot 100 at a fixed or adjustable sampling frequency (preferably synchronizing to the lighting of the first light source module 11 and the second light source module 12), and the image frames F are sent to the processor 14 for post-processing. More specifically, the image sensor 13 has a field of view (FOV) which covers the first light section LS1 and the second light section LS2.

The processor 14 is, for example, a micro controller unit (MCU), a central processing unit (CPU), a graphic processing unit (GPU) or an application specific integrated circuit (ASIC), and used to calculate an object depth (described by an example below) according to a first line image associated with the first light section LS1 and a second line image associated with the second light section LS2 in the image frame F.

The memory 12 includes a volatile memory and/or a non-volatile memory, and used to previously store the algorithm and parameters for calculating the object depth and performing the identification.

In the first embodiment, the processor 14 controls the first light source module 11 and the second light source module 12 to project the first light section LS1 and the second light section LS2 successively or simultaneously.

Figure 2A:
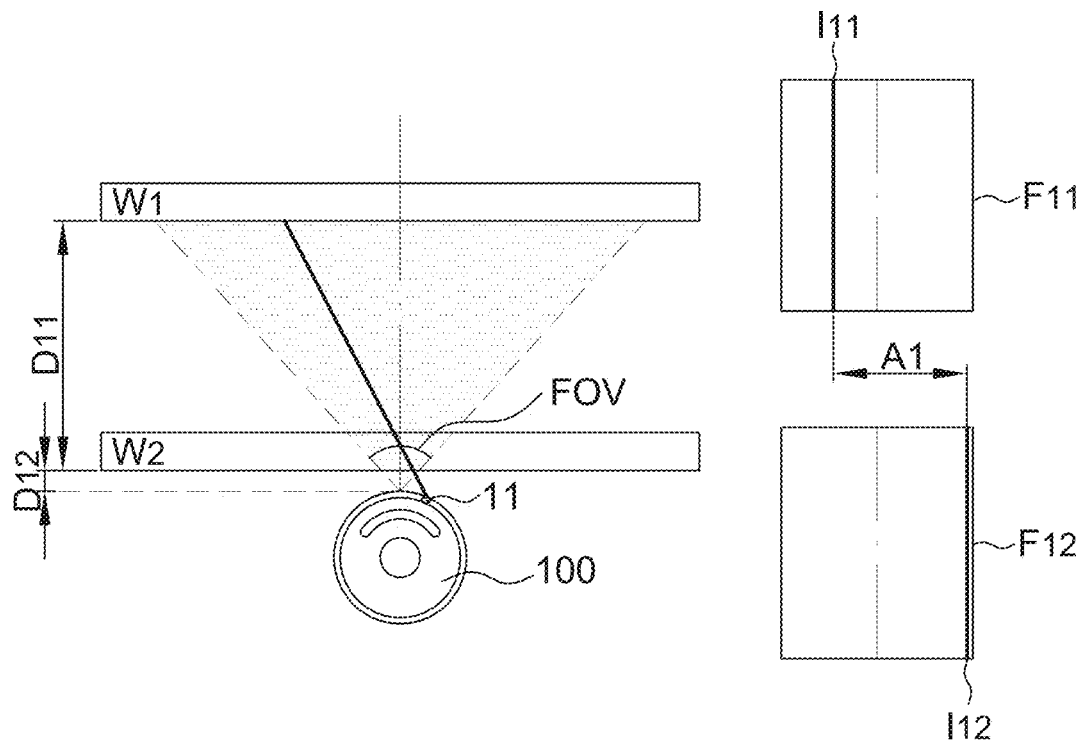
FIG. 2A is an operational schematic diagram of lighting a first light source of a cleaning robot according to the first embodiment of the present disclosure.
Figure 2B:
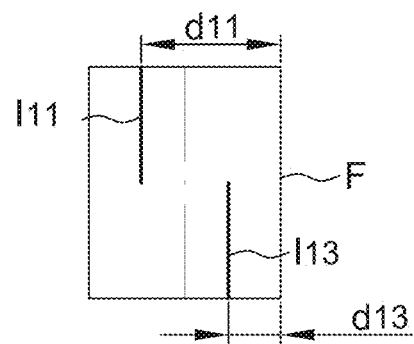
FIG. 2B is a schematic diagram of an image frame acquired by an image sensor when lighting the first light source of a cleaning robot according to the first embodiment of the present disclosure.
Figure 3A:
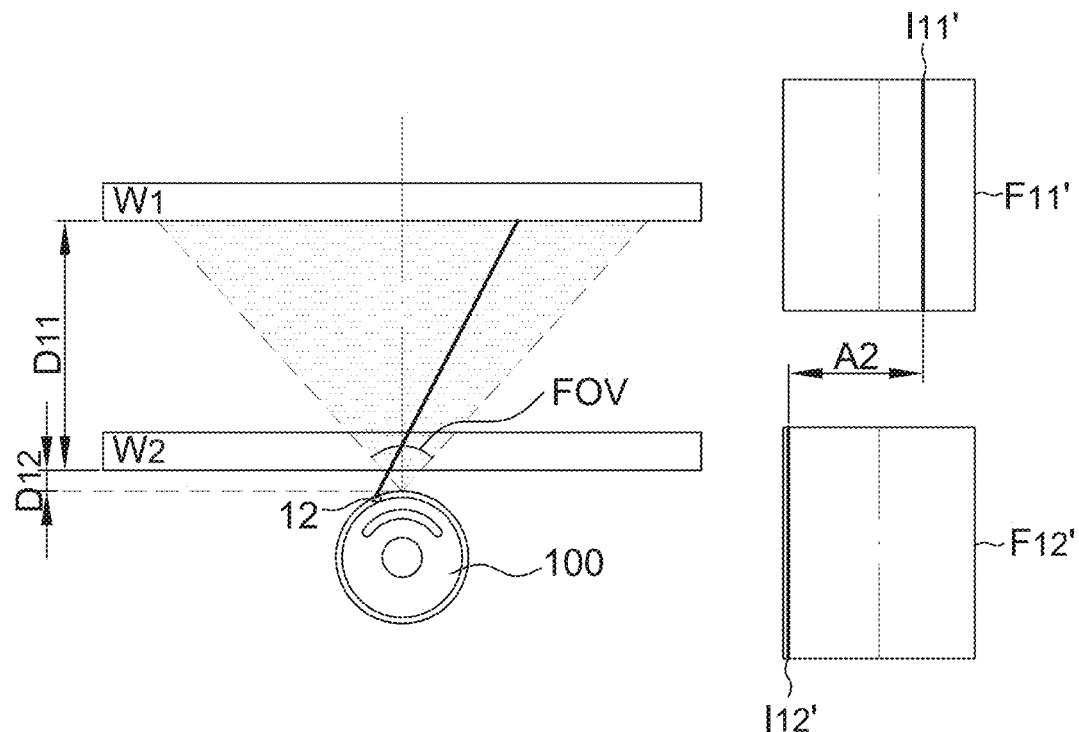
FIG. 3A is an operational schematic diagram of lighting a second light source of a cleaning robot according to the first embodiment of the present disclosure.

Please referring to FIGS. 2A-2B and FIGS. 3A-3B, they are operational schematic diagrams of controlling the first light source module 11 and the second light source module 12 to emit light alternatively, e.g., lighting the first light source module 11 at a first time (as shown in FIG. 2A), and then lighting the second light source module 12 at a second time (as shown in FIG. 3A), and repeatedly operating in this way.

As shown in FIG. 2A, when the first light source module 11 is lighted and a front object W1 is located at a maximum detectable distance $D_{11}$, the image sensor 13 captures an image frame $F_{11}$ containing a first line image $I_{11}$ associated with a first light section LS1; whereas, when a front object W2 is located at a minimum detectable distance $D_{12}$, the image sensor 13 captures an image frame $F_{12}$ containing a first line image $I_{12}$ associated with the first light section LS1. In this embodiment, as the first light source module 11 projects the first light section LS1 toward a left-front direction, an effective area A1 between $I_{11}$ and $I_{12}$ of the image frame exceeds a half of a size of image frame, i.e. any object existing between W1 and W2 appearing within the effective area A1.

When different objects exist in front of the cleaning robot 100 at different depths, e.g., a lower object being closer and a higher object being farther, the image sensor 13 captures an image frame F as shown in FIG. 2B, wherein an upper part $I_{11}$ of the first line image (corresponding to the upper part of the first light section LS1) is distanced from a right edge of the image frame F by $d_{11}$, and a lower part $I_{13}$ of the first line image (corresponding to the lower part of the first light section LS1) is distanced from the right edge of the image frame F by $d_{13}$, which is different from $d_{11}$. The processor 14 then calculates first distances (e.g., $d_{11}$, $d_{13}$ herein) of the first line image (e.g., including $I_{11}$, $I_{13}$ herein) from a first edge (e.g., right edge herein) of the image frame F, and identifies first object depths according to the first distances $d_{11}$, $d_{13}$, wherein each of the first distances $d_{11}$, $d_{13}$ corresponds to one object depth (e.g., $d_{11}$ corresponding to a distance between the higher object and the cleaning robot 100, and $d_{13}$ corresponding to a distance between the lower object and the cleaning robot 100).

The memory 15 previously records a first relative relation, e.g., a mathematical equation or a look-up table, between the first distance and the first object depth. While obtaining one or multiple first distances, the processor 14 accesses the memory 15 to obtain an object depth corresponding to every first distance. It should be mentioned that although the first distance in this embodiment is illustrated by taking a distance between the first line image $I_{11}$, $I_{13}$ and a right edge of the image frame F as an example, the present disclosure is not limited thereto. In other embodiments, the first distance is selected as a distance between the first line image and a left edge of the image frame F.

As shown in FIG. 3A, when the second light source module 12 is lighted and a front object W1 is located at a maximum detectable distance $D_{11}$, the image sensor 13 captures an image frame $F_{11}'$ containing a second line image $I_{11}'$ associated with a second light section LS2; whereas, when a front object W2 is located at a minimum detectable distance $D_{12}$, the image sensor 13 captures an image frame $F_{12}'$ containing a second line image $I_{12}'$ associated with the second light section LS2. In this embodiment, as the second light source module 12 projects the second light section LS2 toward a right-front direction, an effective area A2 between $I_{11}'$ and $I_{12}'$ of the image frame also exceeds a half of the size of image frame, i.e. any object existing between W1 and W2 appearing within A2.

Figure 3B:
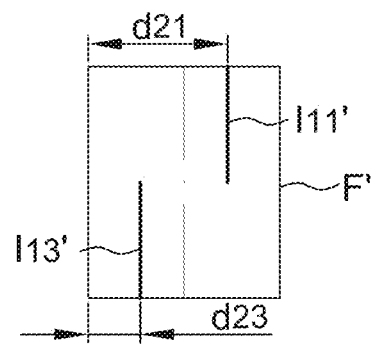
FIG. 3B is a schematic diagram of an image frame acquired by an image sensor when lighting the second light source of a cleaning robot according to the first embodiment of the present disclosure.

When different objects exist in front of the cleaning robot 100 at different depths, e.g., a lower object being closer and a higher object being farther, the image sensor 13 captures an image frame F' as shown in FIG. 3B, wherein an upper part $I_{11}'$ of the second line image (corresponding to the upper part of the second light section LS2) is distanced from a left edge of the image frame F by $d_{21}$, and a lower part $I_{13}'$ of the second line image (corresponding to the lower part of the second light section LS2) is distanced from the left edge of the image frame F by $d_{23}$, which is different from $d_{21}$. The processor 14 then calculates second distances (e.g., $d_{21}$, $d_{23}$ herein) of the second line image (e.g., including $I_{11}'$, $I_{13}'$ herein) from a second edge (e.g., left edge herein) of the image frame F', and identifies second object depths according to the second distances $d_{11}$, $d_{13}$, wherein each of the second distances $d_{21}$, $d_{23}$ corresponds to one object depth (e.g., $d_{21}$ corresponding to a distance between the higher object and the cleaning robot 100, and $d_{23}$ corresponding to a distance between the lower object and the cleaning robot 100).

The memory 15 previously records a second relative relation, e.g., a mathematical equation or a look-up table, between the second distance and the second object depth. While obtaining one or multiple second distances, the processor 14 accesses the memory 15 to obtain an object depth corresponding to every second distance. It should be mentioned that although the second distance in this embodiment is illustrated by taking a distance between the second line image $I_{11}'$, $I_{13}'$ and a left edge of the image frame F as an example, the present disclosure is not limited thereto. In other embodiments, the second depth is selected as a distance between the second line image and a right edge of the image frame F.

In this embodiment, the processor 14 firstly calculates an average line or a gravity center line of each line image corresponding to the first light section LS1 and the second light section LS2 in the image frame (calculating multiple average lines or multiple gravity center lines for multiple line images), and respectively calculates object depths according to distances of the calculated average line or the calculated gravity center line from two opposite edges of the image frame, as shown in FIGS. 2B and 3B that line images $I_{11}$, $I_{13}$, $I_{11}'$, $I_{13}'$ are average lines or gravity center lines of the associated line image. However, if the line image is narrow enough, the average line or the gravity center line is not calculated.

It is appreciated that the two walls W1 and W2 shown in FIGS. 2A and 3A are referred to individual detection conditions at different times, and are not referred to that light emitted by the first light source module 11 and the second light source module 12 penetrates the closer wall W2.

It should be mentioned that FIGS. 2A-2B and FIGS. 3A-3B show only the image of light sections projected on the wall, e.g., W1 and W2, in front of the cleaning robot 100, and the image of light sections projected on the ground in front of the cleaning robot 100 is not shown (described by an example below).

When the processor 14 controls the first light source module 11 and the second light source module 12 to emit light simultaneously, the first light section LS1 and the second light section LS2 preferably have different section features to allow the processor 14 to distinguish from each other and calculate the object depth respectively.

Figure 4:
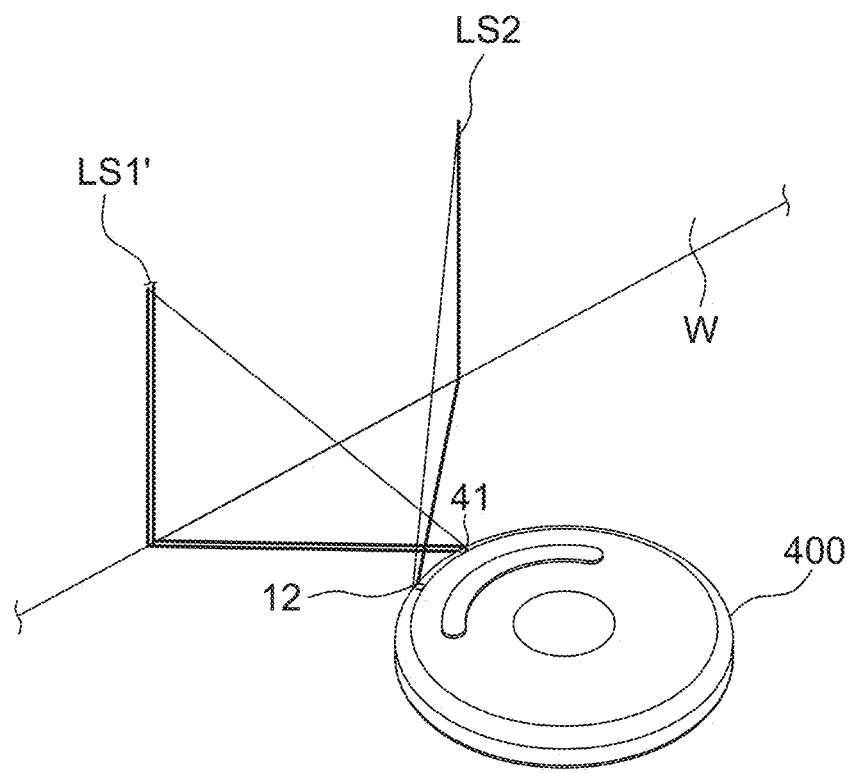
FIG. 4 is an operational schematic diagram of a cleaning robot according to a second embodiment of the present disclosure.

For example referring to FIG. 4, it is an operational schematic diagram of a cleaning robot 400 according to a second embodiment of the present disclosure. The difference between the second embodiment from the first embodiment is that the first light source module 41 projects two first light sections LS1' to be distinguishable from the second light section LS2 by the processor 14. In this embodiment, the DOE1 112 is arranged in a way that when the light emitted by the first light source 111 goes through, multiple vertical first light sections, parallel to each other, are generated. In addition, elements identical to those of the first embodiment are indicated by the same reference numerals, and details thereof are not repeated again. In the second embodiment, in calculating an object depth associated with the first light section LS1', the processor 14 firstly calculates an average line or a gravity center line of the two line images, associated with two first light sections LS1', in the image frame F captured by the image sensor 13, and calculates the object depth according to a distance of the average line or the gravity center line from a left or right edge of the image frame F. Because the calculation method is similar to those shown in FIGS. 2B and 3B, one of ordinary skill in the art would understand after understanding the descriptions of FIGS. 2B and 3B, and thus details thereof are not repeated herein.

Figure 5:
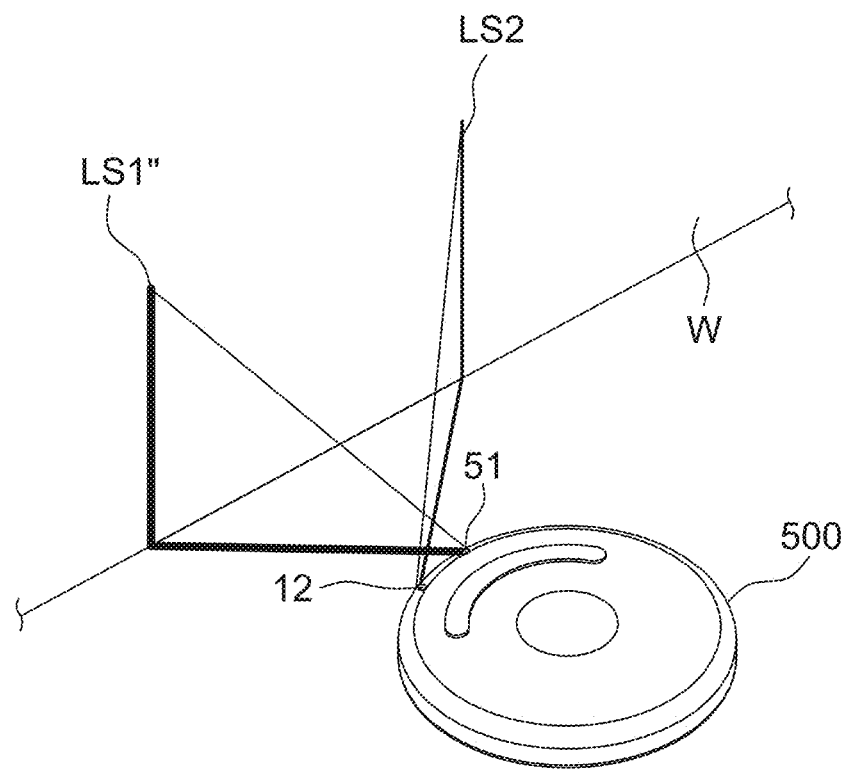
FIG. 5 is an operational schematic diagram of a cleaning robot according to a third embodiment of the present disclosure.

Referring to FIG. 5, it is an operational schematic diagram of a cleaning robot 500 according to a third embodiment of the present disclosure. The difference between the third embodiment from the first embodiment is that the first light source module 51 projects a wider or brighter first light section LS1" to be distinguishable from the second light section LS2 by the processor 14. In addition, elements identical to those of the first embodiment are indicated by the same reference numerals, and details thereof are not repeated again. In the third embodiment, in calculating an object depth associated with the first light section LS1", the processor 14 firstly calculates an average line or a gravity center line of the line image, associated with the wider or brighter first light section LS1", in the image frame F captured by the image sensor 13, and calculates the object depth according to a distance of the average line or the gravity center line from a left or right edge of the image frame F. Because the calculation method is similar to those shown in FIGS. 2B and 3B, one of ordinary skill in the art would understand after understanding the descriptions of FIGS. 2B and 3B, and thus details thereof are not repeated herein.

In other words, the section feature in the present disclosure includes a number of line sections, a width of line section, an intensity of line section and/or a flicker frequency of line section.

Figure 6A:
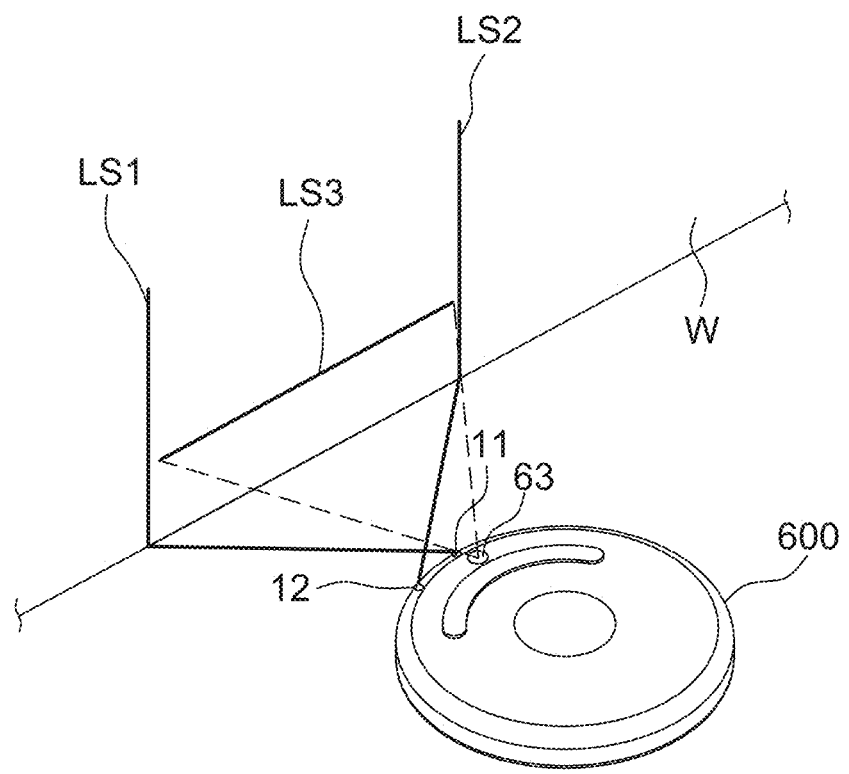
FIG. 6A is an operational schematic diagram of a cleaning robot according to a fourth embodiment of the present disclosure.

Please referring to FIG. 6A, it is an operational schematic diagram of a cleaning robot 600 according to a fourth embodiment of the present disclosure. In addition to the first light source module 11, the second light source module 12, the image sensor 13, the processor 14 and the memory 15 (e.g., referring to FIG. 1B), the cleaning robot 600 further includes a third light source module 63 used to project a horizontal light section LS3 toward the moving direction. In the fourth embodiment, elements identical to those of the first embodiment are indicated by the same reference numerals.

Figure 6B:
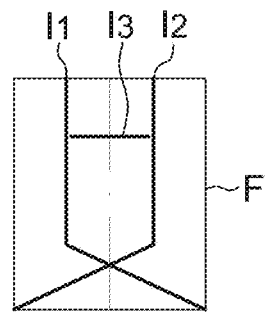
FIG. 6B is a schematic diagram of an image frame captured by an image sensor of a cleaning robot in FIG. 6A, wherein the image sensor does not detect a cliff or an obstacle.

In the fourth embodiment, the first light source module 11 is also used to project a first vertical light section LS1 toward a moving direction, and the second light source module 12 is also used to project a second vertical light section LS2 toward the moving direction, and details thereof are not repeated again. The image sensor 13 is used to acquire an image frame F covering the first light section LS1, the second light section LS2 and the horizontal light section LS3, e.g., FIG. 6B showing that the image frame F contains a first line image $I_1$ corresponding to the first light section LS1, a second line image $I_2$ corresponding to the second line section LS2, and a third line image $I_3$ corresponding to the horizontal line section LS3. FIG. 6B shows both line images projected on the ground (e.g., tilted part) and projected on the wall (e.g., vertical part) in the first line image $I_1$ and the second line image $I_2$, wherein a length ratio between the tilted part and the vertical part is determined according to a distance from the object ahead.

The processor 14 is used to identify a cliff (e.g., stairs) in front of the moving direction according to the first line image $I_1$ associated with the first light section LS1 and the second line image $I_2$ associated with the second light section LS2, and calculates an object depth in front according to the third line image $I_3$ associated with the horizontal light section LS3.

Figure 6C:
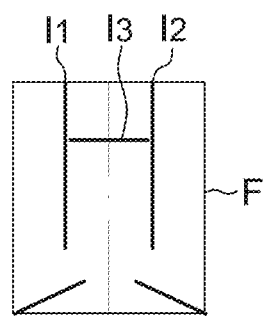
FIG. 6C is a schematic diagram of an image frame captured by an image sensor of a cleaning robot in FIG. 6A, wherein the image sensor detects a cliff but does not detect an obstacle.

For example referring to FIG. 6C, if the first line image $I_1$ and the second line image $I_2$ in the image frame F lack of a part of lower line image, it means that no movable surface ahead. In this case, the processor 14 identifies that there is a cliff in front of the moving direction and thus continuous movement is not possible. Accordingly, the processor 14 further calculates a distance from the cliff according to a length of the part of lower line image, and controls the cleaning robot 600 to turn its moving direction at a predetermined distance from the cliff. In this embodiment, the memory 15 previously records the relative relation (algorithm or look up table, LUT) between lengths of the tilted line image (e.g., from a bottom edge of the image frame F) and the cliff distance. After calculating a length of the tilted line image, the processor 14 accesses the memory 15 to obtain a distance from the cliff.

Figure 6D:
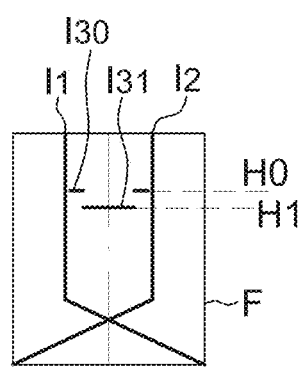
FIG. 6D is a schematic diagram of an image frame captured by an image sensor of a cleaning robot in FIG. 6A, wherein the image sensor does not detect a cliff but detects an obstacle.

For example referring to FIG. 6D, when a height of all or a part of the third line image $I_3$ changes, it means that there is an object in the FOV ahead of the image sensor 13. For example, FIG. 6D shows that the image sensor 13 senses a small object (e.g., a table leg or a chair leg) such that the height of a central part of the third line image $I_3$ changes from H0 to H1. In this embodiment, the memory 15 previously records the relative relation (algorithm or look up table) between different heights and object depths. After calculating the height (one or multiple) of the horizontal line image, the processor 14 accesses the memory 15 to obtain the corresponding object depth.

In the embodiment of FIG. 6D, the third light source module 13 is arranged, for example, to upward project the horizontal light section LS3 such that when an object is closer, the height of the third line image $I_3$ is lower. On the contrary, if the third light source module 13 is arranged to downward project the horizontal light section LS3, the height of the third line image $I_3$ is higher when the object is closer.

In the fourth embodiment, the processor 14 calculates an object depth according to the third line image $I_3$, but does not calculate the object depth according to the first line image $I_1$ or the second line image $I_2$. In addition, the horizontal light section LS3 is selected to be projected between the first light section LS1 and the second light section LS2 to realize the purpose of eliminating the detection dead zone right ahead of the cleaning robot 600. Accordingly, since the object ahead is detectable by using the horizontal light section LS3, the first light section LS1 and the second light section LS2 are selected to be crossing with or parallel to each other in front of the cleaning robot 600 without particular limitations.

Similar to the first embodiment to the third embodiment, the processor 14 in the fourth embodiment controls the first light source module 11 and the second light source module 12 to project the first light section LS1 and the second light section LS2 simultaneously or successively. When the first light source module 11 and the second light source module 12 project the first light section LS1 and the second light section LS2 at the same time, the first light section LS1 and the second light section LS2 preferably have different section features, such as different widths, brightness, numbers and/or flicker frequencies to be distinguished.

In another aspect of the fourth embodiment, a light source group is used to project the first light section LS1, the second light section LS2 and the horizontal light section LS3 toward the moving direction, wherein the light source group includes a first light source module 11 and a second light source module 12 (e.g., referring to FIG. 1B). The first light source module 11 includes a first light source 111 controlled by the processor 14 to emit light, and includes a first diffractive optical element 112 used to generate both the first light section LS1 and the horizontal light section LS3 when the light emitted by the first light source 111 passes therethrough. The second light source module 12 includes a second light source 121 controlled by the processor 14 to emit light, and includes a second diffractive optical element 122 used to generate the second light section LS2 when the light emitted by the second light source 121 passes therethrough. More specifically, in this another aspect the light source group does not include an independent light source for only generating the horizontal light section. The first diffractive optical element 112 is arranged to generate both the first light section LS1 and the horizontal light section LS3 when the light goes through. In an alternative aspect, the light source group is arranged in a way that the second light source module 12 projects both the second light section LS2 and the horizontal light section LS3, but the first light source module 11 projects only the first light section LS1. Similarly, the horizontal light section LS3 is preferably projected between the first light section LS1 and the second light section LS2.

In this another aspect, the image sensor 13 is also used to acquire an image frame F with its field of view covering the first light section LS1, the second light section LS2 and the horizontal light section LS3 as shown in FIG. 6B. The processor 14 is also used to identify a cliff in front of the moving direction and calculates a cliff distance (as shown in FIG. 6C) according to a first line image $I_1$ in the image frame F associated with the first light section LS1 and a second line image $I_2$ in the image frame F associated with the second light section L52, and calculates an object depth according to a third line image $I_3$ (as shown in FIG. 6D) in the image frame F associated with the horizontal light section LS3. Since the calculation and identification have been described above, details thereof are not repeated again.

In this another aspect, the processor 14 is also used to control the first light source module 11 and the second light source module 12 to light simultaneously or sequentially. When the first light source module 11 and the second light source module 12 are lighted simultaneously, the first light section LS1 and the second light section LS2 preferably have different section characteristics.

In the present disclosure, the vertical light section is referred to a light section with its length direction perpendicular to a plane on which the cleaning robot 100, 400, 500 or 600 moves on, and the horizontal light section is referred to a light section with its length direction parallel to the moving plane.

It should be mentioned that the present disclosure is also applicable to other robots rather than a cleaning robot as long as the robot needs to calculate a distance from an object or a cliff in front of a moving direction thereof. The robot includes a light source group, an image sensor 13 and a processor 14. As mentioned above, the light source group projects a first light section LS1 and a second light section LS2 toward a moving direction. The first light section LS1 and a second light section LS2 are vertical light sections and cross with each other at a predetermined distance in front of the robot. The image sensor 13 captures an image frame F covering the first light section LS1 and the second light section LS2. The processor 14 calculates a distance according to a first line image associated with the first light section LS1 and a second line image associated with the second light section LS2 in the image frame F. Details of the operation of the light source group, the image sensor 13 and the processor 14 have been described above, and thus details thereof are not repeated herein.

In addition, by projecting vertical light sections, the robot of the present disclosure is further adaptable to detect an obstacle having other appearances, e.g., identifying a tunnel and calculating a cliff height.

Figure 7A:
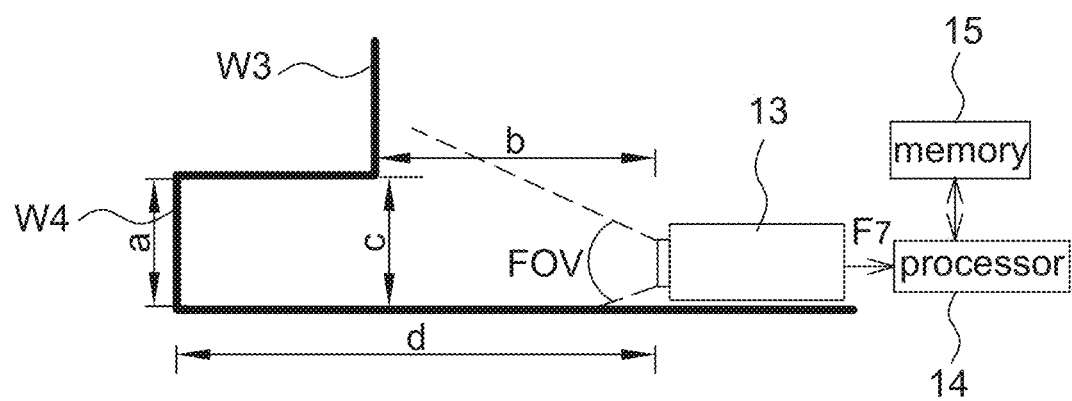
FIG. 7A is an operational schematic diagram of a cleaning robot according to an alternative embodiment of the present disclosure.

For example referring to FIG. 7A, the field of view FOV of the image sensor 13 has a first wall W3 and a second wall W4, wherein the first wall W3 protrudes from the second wall W4 to form a tunnel. It is appreciated that the first wall W3 and the second wall W4 are not limited to the surface of a wall but may be the surface of other furniture or home appliances.

Figure 7B:
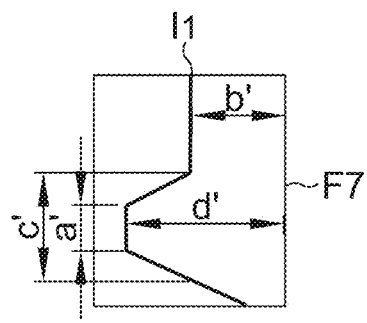
FIG. 7B is a schematic diagram of an image frame captured by an image sensor of a cleaning robot in FIG. 7A.

For simplifying the drawing, FIG. 7A only shows some components of the cleaning robot 100 but omits the rest components. FIG. 7B is a schematic diagram of an image frame F7 acquired by the image sensor 13. In this embodiment, a first light source module 11 projecting a first light section LS1 toward a left-front direction of the image sensor 13 (e.g., referring to FIG. 2A) is taken as an example for illustration. A person skilled in the art would understand details of using a second light source module 12 to project a second light section LS2 toward a right-front direction of the image sensor 13 (e.g., referring to FIG. 3A) after understanding the illustrations below.

As shown in FIG. 7B, the image frame F7 contains two parallel line images respectively distanced from a right edge of the image frame F7 by a transverse distance b' and d', wherein b'<d'. As mentioned above, the memory 15 previously records the relationship, e.g., algorithm or LUT, between different transverse distances and different object depths. When calculating one or more transverse distances, the processor 14 accesses the memory 15 to obtain the object depth (i.e. wall distance herein) corresponding to every transverse distance. In addition, the image frame F7 further contains two vertical distances a' and c'. In this embodiment, the memory 15 further previously records the relationship, e.g., algorithm or LUT, between vertical distances and actual heights at different object depths. When calculating the object depth corresponding to the vertical distance a' and/or c', the processor 14 obtains the actual height a and/or c according to the vertical distance a' and/or c'. The processor 14 identifies whether the cleaning robot 100 can enter the space (i.e. the tunnel) below the first wall. W3 or not.

That is, when the first line image $I_1$ in the image frame F7 has two parallel line images (two vertical line images in FIG. 7B), and the first distance (e.g., b' in FIG. 7B) of an upper line image, among the two parallel line images, from the first edge (e.g., right edge in FIG. 7B) is smaller than the first distance (e.g., d' in FIG. 7B) of a lower line image, among the two parallel line images, from the first edge; or, when the second line image in the image frame F7 has two parallel line images (not shown), and the second distance of an upper line image, among the two parallel line images, from the second edge (e.g., left edge in FIG. 7B) is smaller than the second distance of a lower line image, among the two parallel line images, from the second edge, the processor 14 identifies that there is a tunnel in front of the moving direction.

Figure 8A:
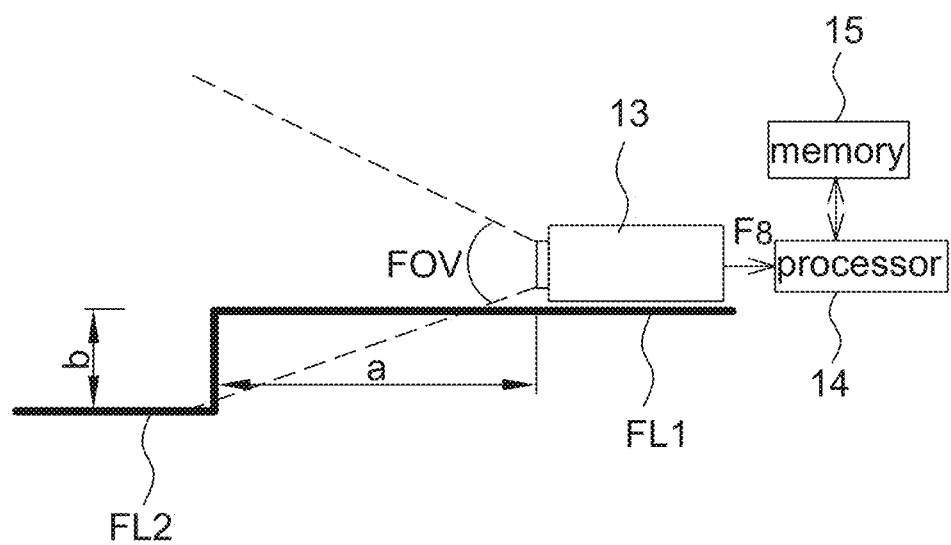
FIG. 8A is an operational schematic diagram of a cleaning robot according to an alternative embodiment of the present disclosure.
Figure 8B:
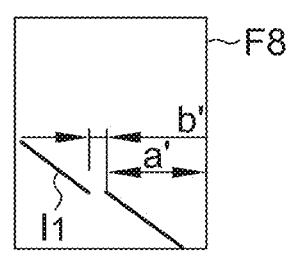
FIG. 8B is a schematic diagram of an image frame captured by an image sensor of a cleaning robot in FIG. 8A.

For example, referring to FIG. 8A, the field of view FOV of the image sensor 13 has a first floor FL1 and a second floor FL2, wherein the first floor FL1 is higher than the second floor FL2 by a vertical distance d to form a cliff. It is appreciated that the first floor FL1 and the second floor FL2 are referred to any surface on which the cleaning robot 100 moves. FIG. 8B is a schematic diagram of an image frame F8 acquired by the image sensor 13. This embodiment is also illustrated by an example of a first light source module 11 projecting a first light section LS1 toward a left-front direction of the image sensor 13. A person skilled in the art would understand details of using a second light source module 12 to project a second light section LS2 toward a right-front direction of the image sensor 13 after understanding the illustrations below. FIG. 8A also shows only some components of the cleaning robot 100 but omits the rest components.

As the first floor FL1 and the second floor FL2 has a height difference, this height difference causes the first line image I$_1$ to form two broken lines with a transverse distance b' therebetween. As shown in FIG. 8B, a top end of the lower broken line has a transverse distance a' from a right edge of the image frame F8. As mentioned above, the memory 15 previously records the relationship, e.g., algorithm or LUT, between different transverse distances and object depths (i.e. cliff distance herein). When calculating the transverse distance a', the processor 14 accesses the memory 14 to obtain a cliff distance a corresponding to the transverse distance a'. The memory 14 further records the relationship, e.g., algorithm or LUT, between different transverse distances a' and b' with respect to actual distances a and b. When calculating the transverse distances a' and b', the processor 14 obtains both the cliff distance a and the cliff height b.

As mentioned above, the conventional cleaning robot adopting image sensors have the detection dead zone ahead to have the problem of bumping with an object within the detection dead zone. Accordingly, the present disclosure further provides a cleaning robot (e.g., FIGS. 1A-1B and 4-6A) that eliminate the detection dead zone in a moving direction by projecting vertical light sections crossing with each other or projecting both the vertical light sections and a horizontal light section. The cleaning robot of the present disclosure also has a function of cliff detection.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A cleaning robot, comprising:
  a first light source module configured to project a first light section toward a moving direction;
  a second light source module configured to project a second light section toward the moving direction, wherein the first light section and the second light section are vertical light sections perpendicular to a plane on which the cleaning robot moves on, and the vertical light sections are crossing with each other at a predetermined distance in front of the cleaning robot;
  an image sensor configured to capture an image frame covering the first light section and the second light section,
    wherein a field of view of the image sensor for capturing the image frame has a left boundary corresponding to a left side of the cleaning robot and a right boundary corresponding to a right side of the cleaning robot, and
    wherein both distal ends of the first light section and the second light section fall between the left boundary and the right boundary of the field of view of the image sensor; and
  a processor configured to calculate an object depth according to a first line image associated with the first light section and a second line image associated with the second light section in the image frame.

2. The cleaning robot as claimed in claim 1, wherein
  the first light source module and the second light source module are configured to successively project the first light section and the second light section, or
  the first light source module and the second light source module are configured to simultaneously project the first light section and the second light section, and the first light section and the second light section have different section features.

3. The cleaning robot as claimed in claim 1, wherein the first light source module comprises:
  a first light source configured to be controlled by the processor to emit light; and
  a first diffractive optical element configured to generate the first light section when the light emitted by the first light source passes therethrough.

4. The cleaning robot as claimed in claim 1, wherein the second light source module comprises:
  a second light source configured to be controlled by the processor to emit light; and
  a second diffractive optical element configured to generate the second light section when the light emitted by the second light source passes therethrough.

5. The cleaning robot as claimed in claim 1, wherein the processor is configured to
  calculate a first distance between the first line image and a first edge of the image frame to identify a first object depth according to the first distance; and
  calculate a second distance between the second line image and a second edge of the image frame to identify a second object depth according to the second distance.

6. The cleaning robot as claimed in claim 5, further comprising a memory configured to
  record a first relative relation between the first distance and the first object depth; and
  record a second relative relation between the second distance and the second object depth.

7. The cleaning robot as claimed in claim 5, wherein
  when the first line image in the image frame has two parallel line images, and the first distance of an upper line image, among the two parallel line images, from the first edge is smaller than the first distance of a lower line image, among the two parallel line images, from the first edge, or
  when the second line image in the image frame has two parallel line images, and the second distance of an upper line image, among the two parallel line images, from the second edge is smaller than the second distance of a lower line image, among the two parallel line images, from the second edge, the processor identifies that there is a tunnel in front of the moving direction.

8. A cleaning robot, comprising:
a first light source module configured to project a first light section, which is a vertical light section, toward a moving direction;
a second light source module configured to project a second light section, which is another vertical light section, toward the moving direction, wherein the vertical light section and the another vertical light section are perpendicular to a plane on which the cleaning robot moves on, and the vertical light section and the another vertical light section are crossing with each other in front of the cleaning robot;
a third light source module configured to project a horizontal light section toward the moving direction;
an image sensor configured to capture an image frame covering the first light section, the second light section and the horizontal light section,
wherein a field of view of the image sensor for capturing the image frame has a left boundary corresponding to a left side of the cleaning robot and a right boundary corresponding to a right side of the cleaning robot, and
wherein both distal ends of the first light section and the second light section fall between the left boundary and the right boundary of the field of view of the image sensor; and
a processor configured to
identify a cliff in front of the moving direction according to a first line image associated with the first light section and a second line image associated with the second light section in the image frame, and
calculate an object depth according to a third line image associated with the horizontal light section in the image frame.

9. The cleaning robot as claimed in claim 8, wherein the processor is not configured to calculate the object depth according to the first line image or the second line image.

10. The cleaning robot as claimed in claim 8, wherein the first light source module and the second light source module are configured to successively project the first light section and the second light section.

11. The cleaning robot as claimed in claim 8, wherein the first light source module and the second light source module are configured to simultaneously project the first light section and the second light section, and the first light section and the second light section have different section features.

12. The cleaning robot as claimed in claim 8, wherein the horizontal light section is projected between the first light section and the second light section.

13. The cleaning robot as claimed in claim 8, wherein the processor is configured to
identify an existence of the cliff when the first line image or the second line image in the image frame lacks of a part of lower line image, and
calculate a cliff height.

14. A cleaning robot, comprising
a light source group configured to project a first light section and a second light section, which are vertical light sections, toward a moving direction and project a horizontal light section toward the moving direction, wherein the vertical light sections are perpendicular to a plane on which the cleaning robot moves on, and vertical light sections are crossing with each other in front of the cleaning robot;
an image sensor configured to capture an image frame covering the first light section, the second light section and the horizontal light section,
wherein a field of view of the image sensor for capturing the image frame has a left boundary corresponding to a left side of the cleaning robot and a right boundary corresponding to a right side of the cleaning robot, and
wherein both distal ends of the first light section and the second light section fall between the left boundary and the right boundary of the field of view of the image sensor; and
a processor configured to
calculate a cliff distance in front of the moving direction according to a first line image associated with the first light section and a second line image associated with the second line section in the image frame, and
calculate an object depth according to a third line image associated with the horizontal light section in the image frame.

15. The cleaning robot as claimed in claim 14, wherein the light source group comprises a first light source module and a second light source module,
the first light source module comprises:
a first light source configured to be controlled by the processor to emit light; and
a first diffractive optical element configured to generate the first light section and the horizontal light section when the light emitted by the first light source passes therethrough; and
the second light source module comprises:
a second light source configured to be controlled by the processor to emit light; and
a second diffractive optical element configured to generate the second light section when the light emitted by the second light source passes therethrough.

16. The cleaning robot as claimed in claim 15, wherein the processor is further configured to control the first light source and the second light source to emit light successively.

17. The cleaning robot as claimed in claim 15, wherein the processor is further configured to control the first light source and the second light source to emit light simultaneously, and the first light section and the second light section have different section features.

18. The cleaning robot as claimed in claim 14, wherein the horizontal light section is projected between the first light section and the second light section.

19. A robot, comprising:
a light source group configured to project a first light section and a second light section, which are vertical light sections, toward a moving direction, and the vertical light sections are perpendicular to a plane on which the robot moves on, and the vertical light sections are crossing with each other at a predetermined distance in front of the robot;
an image sensor configured to capture an image frame covering the first light section and the second light section,
wherein a field of view of the image sensor for capturing the image frame has a left boundary corresponding to a left side of the robot and a right boundary corresponding to a right side of the robot, and wherein both distal ends of the first light section and the second light section fall between the left boundary and the right boundary of the field of view of the image sensor; and a processor configured to calculate a distance according to a first line image associated with the first light section and a second line image associated with the second light section in the image frame.

* * * * *